United States Patent [19]

Suzuki

[11] Patent Number: 5,255,137
[45] Date of Patent: Oct. 19, 1993

[54] COOLING SYSTEM FOR RECORDING/REPRODUCING APPARATUS, WITH AIRFLOW RESTRICTED FROM READ/WRITE MEDIA SECTION

[75] Inventor: Hidenori Suzuki, Fujimi, Japan
[73] Assignee: Nippon Conlux Co., Ltd., Tokyo, Japan
[21] Appl. No.: 695,273
[22] Filed: May 3, 1991
[30] Foreign Application Priority Data May 9, 1990 [JP] Japan .................. 2-119274

[51] Int. Cl.$^5$ .................. H05K 7/20; G11B 33/14
[52] U.S. Cl. .................. 360/97.02; 55/385.6; 361/690
[58] Field of Search .................. 369/71, 72, 73, 74; 360/97.02, 97.03; 55/385.2, 385.6, 484, 495, 501, 502; 361/381

[56] References Cited

U.S. PATENT DOCUMENTS

| | | | |
|---|---|---|---|
| 4,092,687 | 5/1978 | Butsch | 360/97.02 X |
| 4,147,299 | 4/1979 | Freeman | 361/381 |
| 4,194,225 | 3/1980 | Hasler | 360/97.02 X |
| 4,308,041 | 12/1981 | Ellis et al. | 360/97.02 X |
| 4,317,146 | 2/1982 | Gervais | 360/97.03 X |
| 4,337,491 | 6/1982 | Hasler et al. | 360/97.02 X |
| 4,369,475 | 1/1983 | Ho et al. | 360/97.02 X |
| 4,381,528 | 4/1983 | Fujioka | 360/97.02 X |
| 4,583,213 | 4/1986 | Bracken | 360/97.02 X |
| 4,633,349 | 12/1986 | Beck et al. | 360/97.02 X |
| 4,642,715 | 2/1987 | Ende | 360/97.02 X |
| 4,691,274 | 9/1987 | Matouk et al. | 361/384 X |
| 5,063,477 | 11/1991 | Paggen et al. | 361/381 |

FOREIGN PATENT DOCUMENTS 59-101077  6/1984  Japan .
2142786  1/1985  United Kingdom .

OTHER PUBLICATIONS

"Induced Cooling in a Unit Cooling Scheme", *IBM Technical Disclosure Bulletin*, G. E. Doody, et al., vol. 25, No. 7B, Dec. 1982.
"Cooling Electrical Equipment", *IBM Technical Disclosure Bulletin*, D. S. Gaunt, et al., vol. 20, No. 6, Nov. 1977.
"Ventilation System for Data Processing Systems", *IBM Technical Disclosure Bulletin*, J. R. Hammer, et al., vol. 17, No. 9, Feb. 1975.

*Primary Examiner*—Eugene R. LaRoche
*Assistant Examiner*—Michael C. Kessell
*Attorney, Agent, or Firm*—Spensley Horn Jubas & Lubitz

[57] ABSTRACT

An apparatus for recording informations in an information recording medium such as an optical card or the like and reproducing the recorded informations therefrom includes as essential components a housing, an instrument section arranged in the housing for recording/reproducing informations, a supply source duct arranged in the housing while having a supply source circuit board received therein, an air intake port formed on one side wall of the supply source duct, an air outlet port formed on another side wall of the supply source duct, an air flow passage formed between the one side wall of the supply source duct and the supply source circuit board so as to allow the air intake port to be communicated with the air outlet port, and a cooling fan disposed in the air outlet port. The supply source duct is arranged adjacent to the instrument section. It is preferable that the air intake port is formed on a bottom wall of the supply source duct and the air inlet port is formed on a rear side wall of the supply source duct.

18 Claims, 2 Drawing Sheets

COOLING SYSTEM FOR RECORDING/REPRODUCING APPARATUS, WITH AIRFLOW RESTRICTED FROM READ/WRITE MEDIA SECTION

BACKGROUND OF THE INVENTION

1. Field of the Invention

The present invention relates generally to an apparatus for recording/reproducing information. More particularly, the present invention relates to a unit for effectively cooling heat generating portions on a supply source circuit in an instrument section for recording a number of information in an information recording medium such as an optical card or the like and regenerating the recorded informations therefrom.

2. Description of the Related Art

An apparatus for recording/reproducing information by irradiating a laser beam to an information recording medium such as an optical card or the like has been hitherto known. The apparatus includes an instrument section for recording a large number of information by irradiating a laser beam to the optical card while the optical card is displaced relative to an optical head. To drive and control the instrument section, an electronic control circuit including semiconductor integrated circuits and various electronic components is arranged in a common housing. Since some of the electronic components in the electric control circuit generate heat as they are fed with an electric current, there is a need of cooling the electronic components by introducing a cooling air into the housing from the outside. To this end, the electronic components have been heretofore cooled by introducing an environmental air into the housing via an air intake port so as to allow the cooling air to flow through the whole area of the housing.

With the conventional apparatus constructed in the above-described manner, however, since the cooling air is introduced into the whole area of the housing together with dusts in an environmental atmosphere, there arises a problem that the dusts adhere to the light receiving surface of the optical head for recording information in the optical card and regenerating the recorded information therefrom or water drops are deposited on the same. As a result, an operation for recording and regenerating informations fails to be performed correctly and exactly.

SUMMARY OF THE INVENTION

The present invention has been made with the foregoing background in mind.

An object of the present invention is to provide an apparatus for recording/reproducing information wherein the apparatus assures that heat generating electronic components only in a control circuit section are effectively cooled without an occurrence of undesirable adhesion of dusts to the light receiving surface of an optical head in an instrument section.

To accomplish the above object, the present invention provides an apparatus for recording/reproducing information, wherein the apparatus comprises a housing, an instrument section arranged in the housing for recording/reproducing information, a supply source duct arranged in the housing, a supply source circuit board received in the supply source duct, an air intake port formed in the supply source duct, an air outlet port formed in the supply source duct, an air flow passage formed between one side wall of the supply source duct and the supply source circuit board so as to allow the intake air port to be communicated with the air outlet port, and a cooling fan disposed in the air outlet port.

According to the present invention, a cooling air is introduced into the interior of the supply source duct via the air intake port and the air flow passage between the side wall of the supply source duct and the supply source circuit board, and after it cools heat generating electronic components in the supply source section, it is discharged to the outside via the air outlet port. Thus, the apparatus can perform correct recording/reproducing operations at all times.

Further, according to the present invention, the instrument section for recording/reproducing information and the supply source circuit for driving and controlling the instrument section are received in a common housing, and an air flow passage is formed therebetween. As a result, a cooling air flows through the whole area of the supply source duct, and electronic components on a supply source duct board can effectively be cooled without an occurrence of undesirable adhesion of dusts in the cooling air to an optical head and an optical card in the instrument section. Accordingly, there is no possibility that the optical head and the optical card are adversely affected by the dusts in the cooling air.

Other objects, features and advantages of the present invention will become apparent from reading of the following description which has been made in conjunction of the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which illustrate an apparatus for recording/reproducing information in accordance with a preferred embodiment of the present invention.

Figure 1:
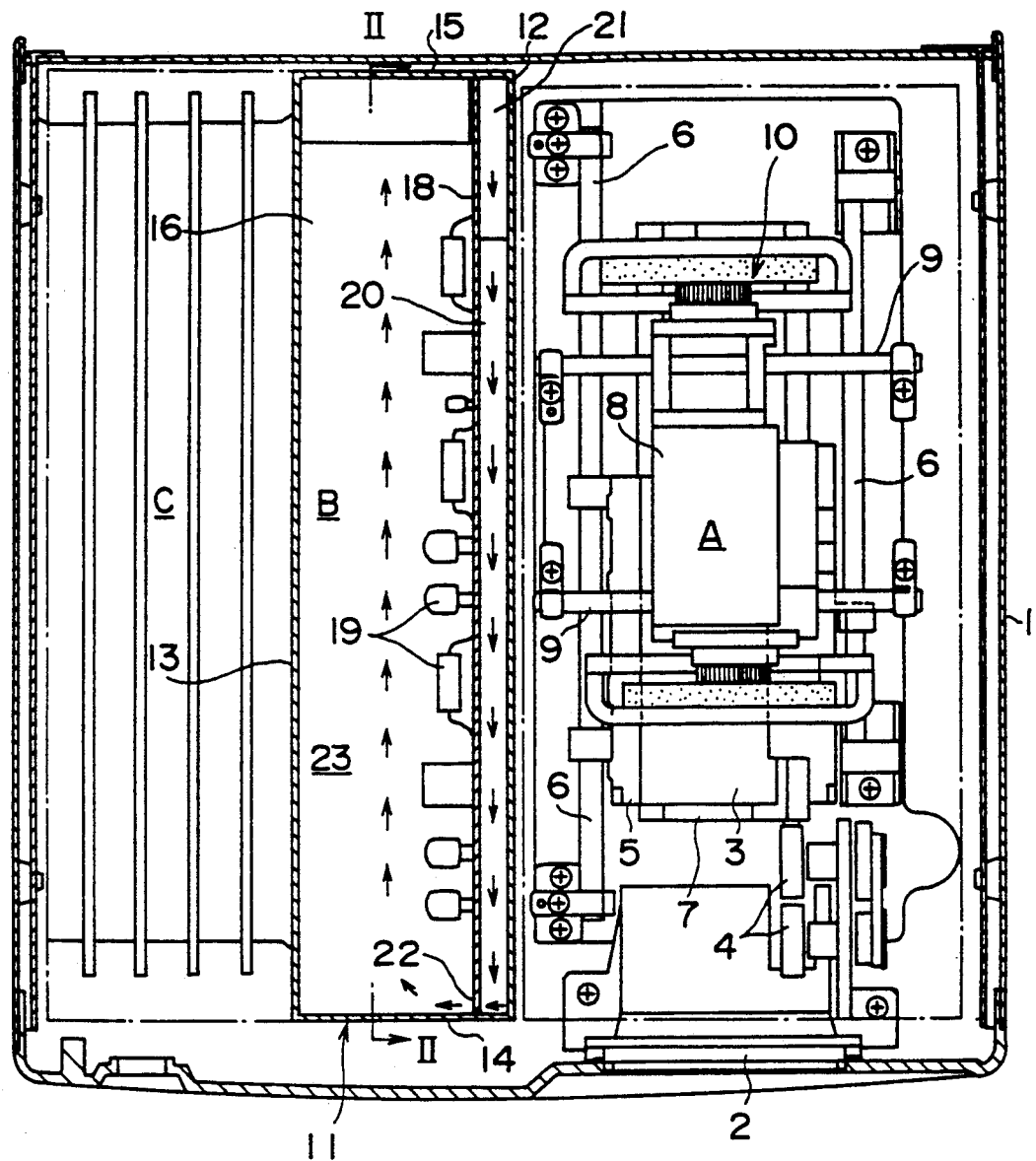
FIG. 1 is a plan view of an apparatus for recording/reproducing information in accordance with an embodiment of the present invention.

In FIG. 1, reference numeral 1 designates a housing for the apparatus. The housing 1 is divided into an instrument section A, a power supply source circuit section B and a control circuit section C. In the instrument section A, information is recorded in an optical card 3 inserted through a card inlet 2 to serve as an information recording medium by irradiating a laser light toward the optical card 3 and the recorded information is regenerated from the optical card 3 as required.

The instrument section A will be described below in more details.

As the optical card 3 is inserted through the card inlet 2 into the interior of the apparatus, a feed roller mechanism 4 is activated to deliver the optical card 3 onto a card conveyance platform 5 in the instrument section A. The card conveyance platform 5 is adapted to linearly reciprocably move along a pair of guide shafts 6 in the longitudinal direction as seen in FIG. 1, as a linear motor 7 is driven. As is apparent from the drawing, the guide shafts 6 are arranged in the longitudinal direction in parallel with each other. The linear motor 7 is composed of a coil mounted on the card conveyance platform 5 side and an armature inclusive of permanent magnets fixedly mounted on the housing 1 side.

In addition, an optical head carriage 8 adapted to linearly reciprocably move in the transverse direction as seen in the drawing at right angle relative to the direction of movement of the card conveyance platform 5 is operatively mounted on the card conveyance platform 5. As a linear motor 10 is driven, the optical head carriage 8 linearly and reciprocably moves along a pair of guide shafts 9 arranged in the transverse direction in parallel with each other. The linear motor 10 is composed of a coil mounted on the optical head carriage 8 side and an armature fixedly mounted on the housing 1 side.

A supply source duct 11 is accommodated adjacent to the instrument section A in the housing 1. The supply source duct 11 is composed of side walls 12 and 13, a front wall 14, a rear wall 15, a bottom wall 16 and a top wall 17. A supply source circuit board 18 is arranged along the side wall 12 in the supply source duct 11. Additionally, various electronic components 19 constituting a supply source circuit are mounted on the supply source board 18.

An air flow passage 20 is formed between the supply source circuit board 18 and the side wall 12. An air intake port 21 serving as an inlet for the air flow passage 20 is formed in the bottom wall 16 so as to allow the air flow passage 20 to be communicated with the outside via the air intake port 21. In addition, an air flow return port 22 is formed at the position adjacent to the front wall 14 of the supply source circuit board 18.

The supply source duct 11 includes a supply source chamber 23 which is formed with an air outlet port 24 in which a cooling fan 25 is disposed. It is desirable that a cooling fan adapted to be driven by a brushless motor is employed for the cooling fan 25.

Figure 3:
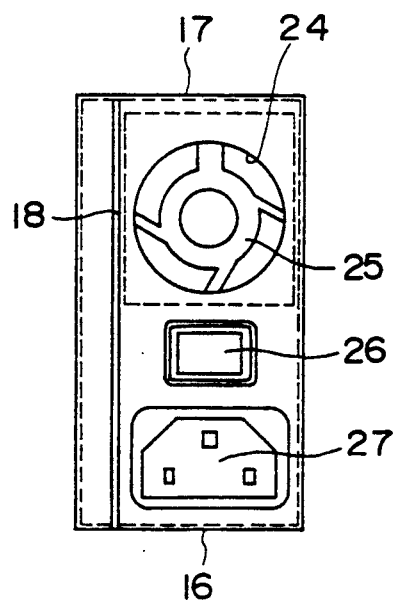
FIG. 3 is a view of a supply source duct for the apparatus as seen from the rear side.

In FIG. 3, reference numeral 26 designates a supply source switch and reference numeral 27 designates a supply source inlet.

Figure 2:
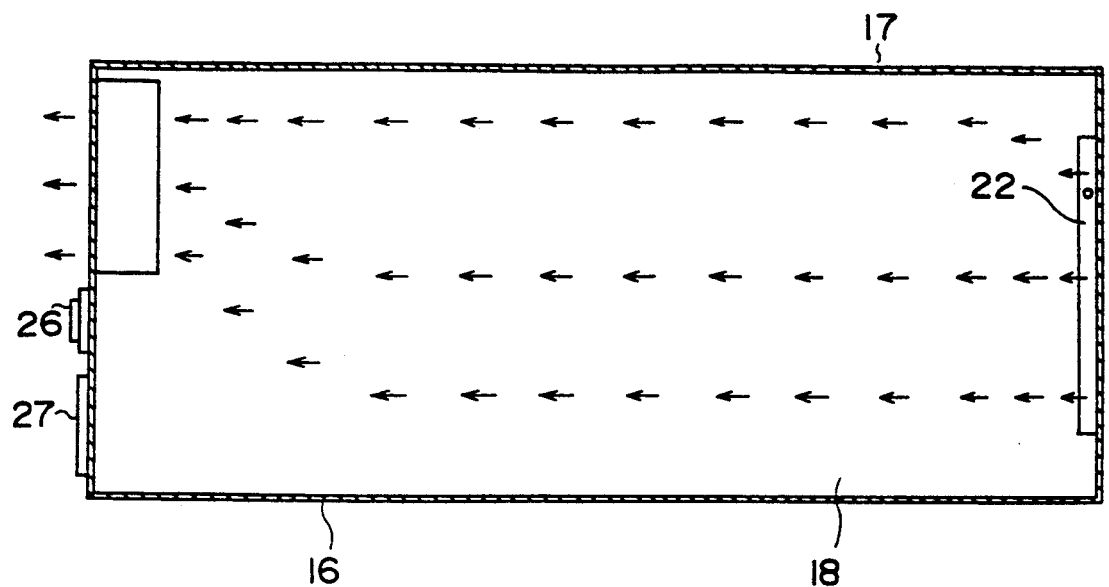
FIG. 2 is a sectional view of the apparatus taken along II—II in FIG. 1.

With the apparatus constructed in the above-described manner, as the cooling fan 25 is rotated, as shown in FIGS. 1 and 2, an environmental air is introduced into the air flow passage 20 via the air intake port 21 and then flows through the air flow passage 20 in the arrow-marked direction while cooling the side wall 12 on the instrument section A side. The direction of flowing of the cooling air through the air flow passage 20 is reversed at the return port 22 and then the cooling air flows through the supply source chamber 23 in the arrow-marked direction while cooling the electronic components on the supply source circuit board 18. Thereafter, the air is discharged to the outside by the cooling fan 25.

The present invention has been described above with respect to the embodiment wherein the air intake port 21 is formed in the bottom wall 16 of the supply source duct 11 and the outlet port 24 is formed in the rear wall 15 of the same. However, the present invention should not be limited to this arrangement. Alternatively, the air intake port 21 may be formed in the rear wall 15 and the outlet port 24 may be formed in the bottom wall 16. Additionally, a plurality of air intake ports may be formed for the apparatus.

While the present invention has been described above with a single preferred embodiment thereof but it should of course be understood that the present invention should not be limited only to this embodiment but various changed or modifications may be made without departing from the scope of the invention as defined by the appended claims.

What is claimed is:

1. An apparatus for cooling the heat generating portions of an information recording/reproducing device comprising:
   a housing;
   an instrument section arranged in said housing for containing instruments for recording/reproducing information;
   a power supply source section juxtaposed adjacent to said instrument section in said housing, said power supply source section including a power supply source duct, said power supply source duct having a power supply source chamber including therein a power supply source circuit;
   an air flow passage provided between said instrument section and said power supply source chamber for directing a flow of cooling air adjacent to the instrument section and said power supply source section, said air flow passage having a wall essentially sealing said instrument section from the flow of cooling air introduced into said air flow passage and cooling said instrument section by the effect of air flowing along the interior of said wall;
   an air intake port communicating with said air flow passage;
   an air return port for directing said flow of cooling air into said power supply source chamber to subsequently directly cool said power supply source circuit;
   an air outlet port formed in said power supply source duct; and
   a cooling fan disposed in said air outlet port.

2. An apparatus as claimed in claim 1, wherein said power supply source duct comprises opposing front wall and rear wall, and opposing top wall and bottom wall.

3. An apparatus as claimed in claim 2, wherein said air intake port is provided in said bottom wall of the power supply source duct and said air outlet port is formed in said rear wall of the power supply source duct.

4. An apparatus as claimed in claim 2, wherein said air intake port is provided in said bottom wall of the power supply source duct adjacent to said rear wall of the power supply source duct and said air outlet port is provided in said rear wall of said power supply source duct.

5. An apparatus for cooling the heat generating portions of an information recording/reproducing device comprising:
   a housing;
   an instrument section arranged in said housing for containing instruments for recording/reproducing information;
   a power supply source section juxtaposed adjacent to said instrument section in said housing, said power supply source section including a power supply source duct, said power supply source duct having a power supply source chamber wherein said power supply source duct has opposing two side walls, one of said side wall being adjacent to said instrument section, and further has opposing front wall and rear wall, and opposing top wall and bottom wall;

a power supply source circuit board received in said power supply source chamber, said power supply source circuit board including an air flow return port adjacent to the front wall of the supply source duct;

an air flow passage provided between said power supply source chamber and said one wall of said power supply source duct adjacent to said instrument section for directing a flow of cooling air adjacent to said instrument section and said power supply source section and cooling said instrument section by the effect of cooling air flowing along the interior of said one wall;

an air intake port communicating with said air flow passage, said air intake port being provided in said bottom wall of the power supply source duct;

an air outlet port formed in said rear wall of the power supply source duct; and a cooling fan disposed in said air outlet port.

6. An apparatus for cooling the heat generating portions of an information recording/reproducing device comprising:

a housing;

an instrument section arranged in said housing for containing instruments for recording/reproducing information;

a power supply source section juxtaposed adjacent to said instrument section in said housing, said supply source section including a supply source duct, said supply source duct having a power supply source chamber, wherein said supply source duct has opposing two side walls, one of said side walls being adjacent to said instrument section, and further has opposing front wall and rear wall, and opposing top wall and bottom wall;

a supply source circuit board received in said supply source chamber, said power supply source circuit board having an air flow return port adjacent to said front wall of the power supply source duct;

an air flow passage provided between said power supply source chamber and said one wall of said power supply source duct adjacent to said instrument section for directing a flow of cooling air adjacent to said instrument section and said power supply source section and cooling said instrument section by the effect of cooling air flowing along the interior of said one wall;

an air intake port communicating with said air flow passage, said air intake port being provided in said bottom wall of the power supply source duct adjacent to said rear wall of the power supply source duct;

an air outlet port formed in said power supply source duct, said air outlet port being provided in said rear wall of said power supply source duct; and a cooling fan disposed in said air outlet port.

7. An apparatus for cooling the heat generating portions of an information recording/reproducing device comprising:

a housing;

an instrument section arranged in said housing for containing instruments for recording/reproducing information;

a power supply source section juxtaposed adjacent to said instrument section in said housing, said power supply source section including a power supply source duct, said power supply source duct having opposite front wall and rear walls, and opposing tope wall and bottom wall, said walls of said power supplies source duct defining a power supply source chamber including therein a power supply source circuit wherein;

an air flow passage provided between said instrument section and said power supply source chamber for directing a flow of cooling air adjacent to the instrument section and said power supply source section, said air flow passage having a wall essentially sealing said instrument section from the flow of cooling air introduced into said air flow passage and cooling said instrument section by the effect of air flowing along the interior of said wall, wherein said air flow passage extends substantially along a height between the top and the bottom walls of said power supply source duct and a width between the front and rear walls of said power supply source duct;

an air intake port communicating with said air flow passage;

an air outlet port formed in said power supply source duct; and a cooling fan disposed in said air outlet port.

8. A cooling system for information recording/reproducing apparatus comprising:

a housing;

an instrument section provided in said housing for containing instruments for recording/reproducing information;

a power supply source section juxtaposed adjacent to said instrument section in said housing, said power supply source section including a power supply source chamber containing therein power supply source circuitry;

a power supply source circuit board provided in said power supply source chamber;

an air flow passage provided between said power supply source chamber and said instrument section for directing a flow of cooling air adjacent to said instrument section and said power supply source section, said air flow passage having an air intake for receiving a flow of cooling air, a wall facing said instrument section for essentially sealing said instrument section from the air flow and for first cooling said instrument section by the effect of air flowing along the interior of said wall and an air outlet coupled to said power supply source chamber so that said cooling air is discharged into said power supply source chamber to subsequently directly cool the circuitry in said power supply source chamber; and an air discharge outlet provided in said power supply source chamber for discharging said cooling air into the atmosphere.

9. A cooling system as claimed in claim 8, wherein said power supply source chamber comprises a front wall and a rear wall opposing said front wall, and wherein said air intake and said air discharge outlet are provided adjacent to said rear wall.

10. A cooling system as claimed in claim 9, wherein said air outlet is provided adjacent to said front wall.

11. A cooling system for information recording/reproducing apparatus comprising:

a housing;

an instrument section provided in said housing for containing instruments for recording/reproducing information;

a power supply source section juxtaposed adjacent to said instrument section in said housing, said power supply source section including a power supply source chamber containing circuitry;

a power supply source circuit board provided in said supply source chamber, said supply source circuit board defining one wall of said supply source chamber;

an air flow passage having a wall facing said instrument section wherein said air flow passage is defined between said power supply source circuit board and said wall for directing a flow of cooling air adjacent to said instrument section and said power supply source section and cooling said instrument section by the effect of cooling air flowing along the interior of said one wall, said air flow passage further having an air intake for receiving a flow of cooling air and an air outlet coupled to said power supply source chamber so that said cooling air is discharged into said power supply source chamber to directly cool the circuitry in said power supply source chamber; and an air discharge outlet provided in said power supply source chamber for discharging said cooling air into the atmosphere.

12. A cooling system for information recording/reproducing apparatus comprising:

a housing;

an instrument section arranged in said housing for containing instruments for recording/reproducing information;

a power supply source chamber juxtaposed to said instrument section in said housing, said power supply source section including a front wall and a rear wall opposing said front wall;

a power supply source circuit board provided on said power supply source chamber, said power supply source circuit board defining one wall of said power supply source chamber;

an air flow passage provided between said power supply source chamber and said instrument section to direct a flow of cooling air adjacent to said instrument section and said power supply source chamber, said air flow passage having a wall facing said instrument section to cool said instrument section by the effect of cooling air flowing along the interior of said wall and to seal said instrument section from the flow of cooling air;

an air intake port provided adjacent to said rear wall between said air flow passage wall and said power supply source circuit board;

an air flow return port provided between said power supply source chamber and said air flow passage adjacent to said front wall; and an air outlet port provided in said power supply source chamber adjacent to said rear wall.

13. A cooling system for information recording/reproducing apparatus comprising:

a housing;

an instrument section provided in said housing for containing instruments for recording/reproducing information;

a power supply source chamber juxtaposed to said instrument section in said housing, said power supply source chamber containing therein a power supply source circuit;

an air flow passage provided between said power supply source chamber and said instrument section to direct a flow of cooling air adjacent to said instrument section and said power supply source chamber, said air flow passage having a wall facing said instrument section for essentially sealing said instrument section from cooling air introduced into said air flow passage and for cooling said instrument section by the effect of cooling air flowing along the interior of the wall; and a power supply source circuit board for bearing said power supply source circuit thereon, said power supply source circuit board defining one wall of said power supply source chamber;

wherein said power supply source circuit board and said wall facing the instrument section define said air flow passage therebetween.

14. A cooling system for information recording/reproducing apparatus comprising:

a housing;

an instrument section arranged in said housing for containing instruments for recording/reproducing information;

a power supply source section juxtaposed to said instrument section in said housing, said power supply source chamber containing therein a power supply source circuit;

an air flow passage provided between said power supply source chamber and said instrument section to fist direct a flow of cooling air between and adjacent to said instrument section and said power supply source chamber, said air flow passage having a wall facing said instrument section for essentially sealing said instrument section from cooling air introduced into said air flow passage and for cooling said instrument section by the effect of cooling air flowing along the interior of the wall; and a return port provided in the air flow passage for discharging the cooling air into the power supply source chamber to subsequently directly cool the power source supply circuit.

15. A cooling system as claimed in claim 14 further comprising a power supply source circuit board for bearing said power supply source circuit thereon, said power supply source circuit board defining one wall of said power supply source chamber.

16. A cooling system as claimed in claim 15, wherein said return port is formed in said power supply source circuit board, and further comprising an air intake formed in said air flow passage for receiving a flow as cooling air, and an air discharge outlet formed in said power supply source chamber for discharging the cooling air into atmosphere.

17. A cooling system as claimed in claim 16, wherein said housing comprises a front wall and a rear wall opposing said front wall, and wherein said air intake is provided adjacent to said rear wall and said return port is provided adjacent to said front wall.

18. A cooling system as claimed in claim 17, wherein said air discharge outlet is provided adjacent to said rear wall.

* * * * *